United States Patent [19]

Lynn

[11] Patent Number: 6,007,601
[45] Date of Patent: Dec. 28, 1999

[54] LIME ENHANCED PRESSURE FILTRATION OF IRON AND STEEL MAKING SLUDGE

[75] Inventor: John D. Lynn, Center Valley, Pa.

[73] Assignee: Bethlehem Steel Corporation

[21] Appl. No.: 08/916,172

[22] Filed: Aug. 21, 1997

[51] Int. Cl.⁶ .................................................. C22B 1/243
[52] U.S. Cl. .................. 75/773; 75/961; 75/962
[58] Field of Search .............................. 75/773, 961, 962

[56] References Cited

U.S. PATENT DOCUMENTS

| | | | |
|---|---|---|---|
| 3,959,133 | 5/1976 | Fulton | 210/45 |
| 5,364,441 | 11/1994 | Worner | 75/961 |
| 5,435,835 | 7/1995 | Lynn et al. | 75/770 |

FOREIGN PATENT DOCUMENTS

| | | | |
|---|---|---|---|
| 2373491 | 12/1977 | France . | |
| 53-133522 | 11/1978 | Japan | 75/773 |
| 54-4215 | 1/1979 | Japan | 75/773 |

*Primary Examiner*—Melvyn Andrews

[57] ABSTRACT

A method is provided for improving the filtration rate of nonhazardous wastewater streams generated at a steel plant. The solids are concentrated in the wastewater stream. No more than about 5% by weight of lime is added to the concentrated wastewater stream which is then dewatered. A friable filter cake is produced by allowing the solids to harden. The lime addition results in a significant increase in the rate at which the stream may be filtered.

9 Claims, 2 Drawing Sheets

LIME ENHANCED PRESSURE FILTRATION OF IRON AND STEEL MAKING SLUDGE

FIELD OF THE INVENTION

This invention generally relates to a method for improving the filtration rate of iron and steel making wastes, while improving the physical stability of the waste after liquid/solids separation. More particularly, the present invention is to a method for improving the filtration rate of iron and steel making wastes by the controlled addition of lime in order to create a filter cake capable of passing the paint filter test.

BACKGROUND OF THE INVENTION

In integrated steel plants, large quantities of waste materials are produced from air and water treatment facilities within the plant. Wastes generated during operation of these facilities must be collected and treated prior to discharge, in order to meet applicable Environmental Protection Agency ("EPA") discharge criteria. There exist numerous methods for treating and disposing of accumulated wastes.

For example, in my prior U.S. Pat. No. 5,435,835, I disclose a method for chemically stabilizing lead and zinc contaminated steel-making waste. Zinc and lead containing wastes may be classified as hazardous wastes, and must pass the toxicity characteristic leaching protocol (TCLP) test mandated by the EPA. The TCLP test requires that lead (the constituent of concern) levels be below a prescribed 5 ppm level. In order to meet this test, it was found that a 4–8% by weight lime addition would precipitate sufficient lead and also zinc to meet the applicable level. Thus, my prior method is extremely beneficial in reducing zinc and lead quantities in a wastewater stream, and that the resulting slurry passes the TCLP test and is considered nonhazardous.

However, the production and disposal of hazardous waste is not the only or even the primary environmental concern at a steel plant. In addition to the potential hazardous waste produced at steel plants, thousands of tons of nonhazardous waste are also produced. Nonhazardous waste is defined as waste not classified as hazardous under the TCLP test. The nonhazardous waste must pass the paint filter test mandated by the EPA in order to be disposed of in a landfill. The paint filter test requires that a sample of waste be absent of any free water before it becomes landfillable. Thus, solids and liquids must be effectively separated in order for the solids to be disposed of in a landfill. Collected slurries typically contain extremely fine particles, with a low solids concentration, and may also contain oil. Because of the low solids concentration, it becomes difficult to both filter and agglomerate the solids. In addition, the oils contained in the slurry may cause filter cloth blinding, which clogs the filter and prevents effective liquid/solids separation. Thus, dewatering a slurry takes a long time, and may be costly. For instance, in order to filter the slurry at a high rate, larger filtering equipment may be necessary, which then results in significant additional costs.

Even with the addition of large filtering equipment, the nonhazardous waste is accumulated at such a high rate that it is difficult to dispose of the waste as quickly as it is accumulated. There has yet been a method developed which can filter the nonhazardous waste at a rate equal to the rate at which it is accumulated, without incurring outrageous operating cost.

For instance, the slurry may be heated to decrease the slurry viscosity, for enabling more effective liquid/solids separation. However, heating thousands of tons of nonhazardous waste is both expensive and extremely impractical.

Finally, the agglomerated solid mass that has been filtered and dewatered, and is ready for landfill disposal, may be thixotropic and become liquefied upon transportation to a landfill. As such, the material may not be disposed of in a solid waste landfill, because it will not pass the paint filter test upon arrival to the landfill site.

Therefore, there exists a need in the art for a method of improving the filtration rate of nonhazardous iron and steel making wastes, in which the filtered solids do not become liquefied during transport. It is a purpose of this invention to fulfill this and other needs in the art which will become more apparent to the skilled artisan once given the following disclosure.

SUMMARY OF THE INVENTION

A principal object of the present invention to provide a method for increasing the filtration rate of iron and steel making wastes, in which the waste will not become liquefied during transport to a landfill or other disposal facility.

A method for increasing the filtration rate of iron and steel making wastes includes the step of providing a nonhazardous steel plant wastewater stream. The solids are concentrated in the wastewater stream. No more than 5% by weight lime is added to the concentrated wastewater stream. The wastewater stream is dewatered and allowed to harden to form a friable cake that remains solid during transport.

These and other objects and advantages of the invention will be readily apparent in view of the following description and drawings of the above-identified invention.

BRIEF DESCRIPTION OF THE DRAWINGS

The above and other objects and advantages and novel features will become apparent from the detailed description of the preferred embodiment of the invention illustrated in the accompanying drawings, wherein.

DETAILED DESCRIPTION OF THE PREFERRED EMBODIMENT

An integrated steel plant has a variety of facilities, including a blast furnace for making iron, a basic oxygen furnace or melt shop for transforming iron into steel, a vacuum degasser which collects particulate wastes, and a rolling mill which rolls the steel. Each of these facilities uses water, which may become contaminated with oils, greases, and the like. The wastes generated by these facilities must be collected and disposed of in order to meet applicable EPA regulations. Typically, the wastes are transformed into a slurry which must be dewatered prior to discharge to meet the paint filter test. That is, the dewatered slurry must not contain any free water to be landfillable. As used herein, slurry means a solid and liquid mixture which is flowable.

At a typical steel plant, nonhazardous slurry produced by the various facilities of the plant is collected at a general wastewater treatment facility, within the plant. As stated above, a material is classified as nonhazardous when it passes the TCLP test. It is at this facility that potential overflows may occur due to the thousands of tons of accumulated slurry. Because the EPA forbids slurry from being disposed of directly into the ground, the slurry must be effectively filtered prior to discharge. However, the oils and other constituents contained in the slurry prevent filtering of the slurry at a rate higher than the rate at which accumulated, causing overflows. In addition, because of the low solids concentration of these wastewaters, it is often difficult to agglomerate the solids.

In particular, a significant problem to effective filtration is caused by the use of oils in the operation of rolling mills. Palm oils are typically used to lubricate the device as the steel is rolled. Palm oil is extremely durable, and does not break down easily during filtration. Moreover, the oil clogs the filter cloth, resulting in filter cloth blinding which prevents the effective separation of liquids and solids. Thus, it is the presence of oils in the collected waste which constitutes a significant concern regarding effective filtration of the wastewater. The presence of oil in the collected non hazardous waste makes filtration of the slurry an extremely difficult task.

Figure 1:
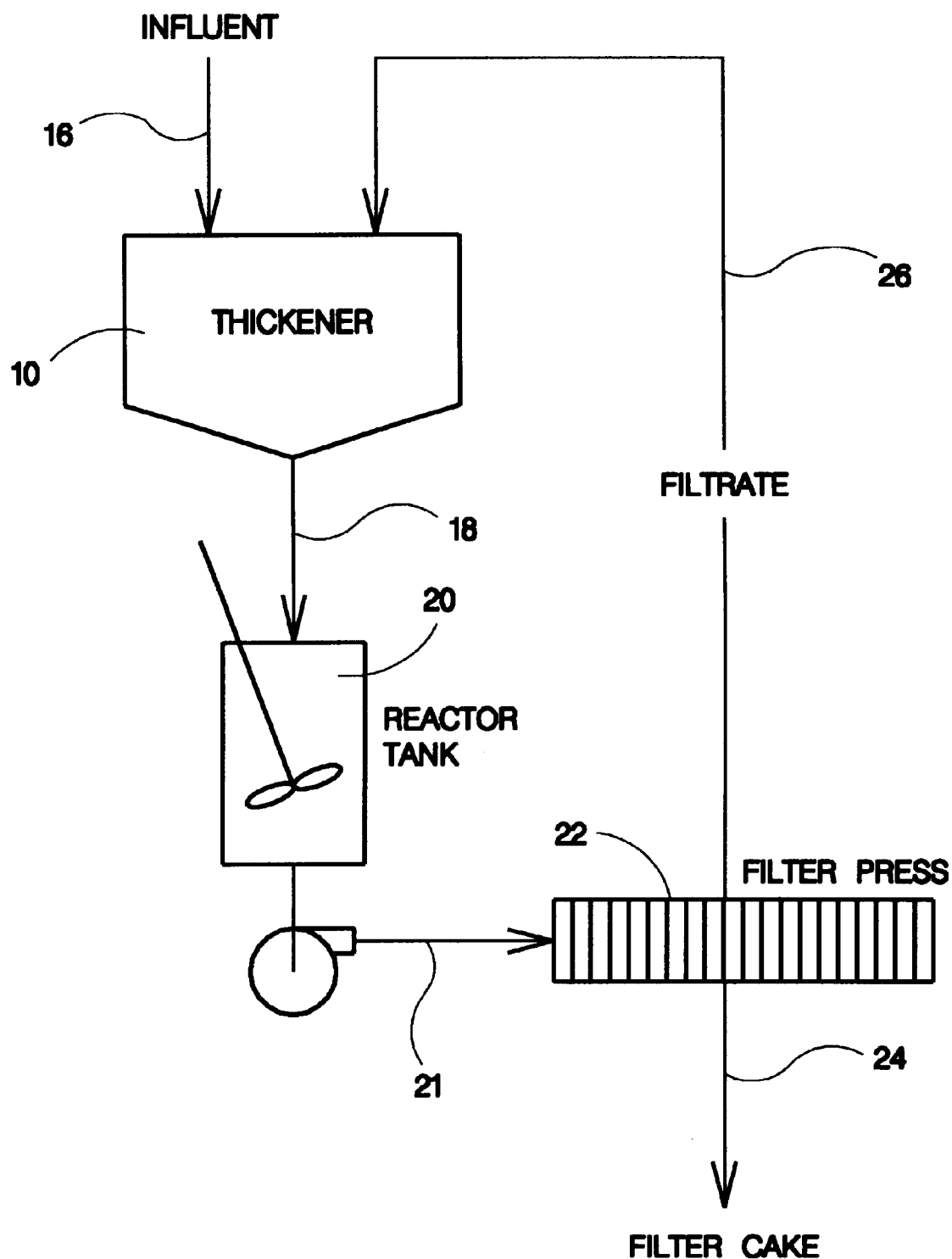
FIG. 1 is a schematic diagram of the system of the invention.

FIG. 1 illustrates a preferred embodiment of the present invention. The solids concentration of the influent wastewater 16 is too low to be filtered efficiently in a plate and frame filter or a belt press. Thus, the wastewater 16 is communicated to a thickener 10. Thickener 10 is used to concentrate the solids of the influent wastewater.

After solids are concentrated in thickener 10, the thickened wastewater 18 is communicated to reactor tank 20. After entering reactor tank 20, thickened wastewater 18 is mixed with lime. The addition of lime increases the filtration rate of the thickened wastewater 18. The lime flocculates the ultra fine particles and coagulates the oils to form a gel, preventing filter cloth blinding, and improving the liquids/solids separation. After the lime is mixed with thickened wastewater 18, the lime slurry 21 is communicated to filter press 22. Filter press 22 dewaters lime slurry 21, to produce a filter cake 24 which passes the paint filter test, and, that may be disposed of as a solid waste in a nonhazardous landfill. The remaining filtrate 26 is communicated back to thickener 10 for further filtration.

Specifically, it was discovered that an addition of between about 1–5% by weight lime was effective in increasing the filtration rate of the slurry. The added lime desirably should be hydrated lime or burnt lime. Hydrated lime is preferred, as it is safer and easier to use than burnt lime. Nevertheless, burnt lime, which is less expensive than hydrated lime, may be used after it is hydrated.

Tests were conducted to determine the effect of lime addition on the filtration rate of a non hazardous steel plant slurry. Table 1 below presents the effect of lime addition to a wastewater treatment facility containing oily mill slurry which was achieved in pilot tests.

chambers, 4'×4'×1.5"). A total of 10 minutes was used for loading and unloading the press.

Tests 1 and 2 respectively, show lime additions of 1 and 0% by weight of lime, based on the dry weight of the solids, to a heated slurry. The slurries in Tests 1 and 2 were heated to 140° F., before the addition of lime. Tests 3–6 show lime additions of 0, 1, 2, and 4% by weight of lime to a non-heated slurry.

When comparing the filtration rates obtained during tests 2 and 3, (0% lime addition to a heated and non-heated slurry) it was discovered that heating the slurry improves the filtration rate of a nonhazardous slurry from 53 dry net tons per day (DNT/day) to 82 DNT/day. Similarly, the filtration time was decreased from 95 minutes to 45 minutes. Thus, it was found that heating the slurry had the effect of reducing the slurry viscosity, enabling effective liquid/solids separation. However, because of the tremendous volume of non hazardous waste produced at a steel plant, heating the entire slurry may be extremely expensive and impractical.

Moreover, when comparing tests 2 and 4, the data shows the filtering time for the slurry with a 1% lime addition at ambient temperatures is also less than the filtering time for the slurry at elevated temperatures without lime addition. The heated slurry with no lime addition had a filtration rate of 82 DNT/day and a filtration time of 45 minutes, while the non-heated slurry with 1% lime addition had a filtration time of 29 minutes and a filtration rate of 99 DNT/day. Thus, while heating the slurry may be effective in increasing the filtration rate of some slurries, a 1% lime addition is more effective and extremely less expensive. In addition, it was discovered that a 1% lime addition to a heated slurry when compared to a 1% lime addition to a non-heated slurry, was not significantly advantageous so as to warrant heating the slurry. When comparing tests 1 and 4, heating of the slurry resulted in a filtration rate of 110 DNT/day, which is comparable to the filtration rate obtained for a non-heated slurry of 99 DNT/day. The filtration time was only decreased by 2 minutes, from 29 minutes to 27 minutes. Thus, as the lime addition is increased, the beneficial effect of heating the slurry is greatly reduced.

Similarly, a lime addition of 1% to a steel plant waste at ambient temperatures significantly reduces the filtration time from 95 minutes to 29 minutes, when compared to a waste stream with no lime addition, also maintained at ambient temperatures, as shown with reference to tests 3 and 4. The reduced filtering time results in improved productivity as measured by the filtration rate—an increased production of 46 DNT/day.

It was further discovered that increasing the lime addition above the 1% level further improves the filtration rate. Tests

TABLE 1

| Test | Filter Feed | | Hyd. Line | Filtration | | Filter Cake Characteristics | | Filtration Rate | |
| --- | --- | --- | --- | --- | --- | --- | --- | --- | --- |
| No. | Temp. F. % | Solids | Added. 1% | Time(min.) | Press.(psi) | % Solids | Sp. Gr. | DNT/Batch | DNT/Day |
| 1 | 140 | 25 | 1 | 27 | 100 | 65 | 1.77 | 3.6 | 110 |
| 2 | 140 | 25 | 0 | 45 | 100 | 66 | 7.79 | 3.7 | 82 |
| 3 | Ambient | 25 | 0 | 95 | 100 | 71 | 1.90 | 4.2 | 53 |
| 4 | Ambient | 25 | 1 | 29 | 100 | 63 | 1.72 | 3.4 | 99 |
| 5 | Ambient | 25 | 2 | 25 | 100 | 63 | 1.72 | 3.4 | 108 |
| 6 | Ambient | 25 | 4 | 18 | 100 | 63 | 1.72 | 3.4 | 126 |

The filtration rate is based on the use of the a 4'×4' plate and frame filter press. The press volume is 100 cubic feet (50

5 and 6 show that a lime addition of 2 and 4%, respectively, increased the filtration rate to 108 DNT/day and 126 DNT/day, respectively, as well as decreased the filtration time to 25 minutes and 18 minutes, respectively. However, these gains may not justify the additional costs associated with the increased lime usage.

Table 2 below presents the effect of lime addition to a waste water treatment facility including the wastes generated from the blow down of a basic oxygen furnace (BOF).

TABLE 2

| Test | Filter Feed | | Hyd. Line | Filtration | | Filter Cake Characteristics | | Filtration Rate | |
|---|---|---|---|---|---|---|---|---|---|
| No. | Temp. F. | % Solids | Added. 1% | Time(min.) | Press.(psi) | % Solids | Sp. Gr. | DNT/Batch | DNT/Day |
| 1 | Ambient | 43 | 0 | 18 | 100 | 77 | 2.43 | 5.8 | 310 |
| 2 | Ambient | 43 | 2 | 16 | 100 | 76 | 2.37 | 5.6 | 309 |
| 3 | Ambient | 43 | 4 | 8 | 100 | 75 | 2.29 | 5.4 | 344 |

All three tests were conducted at ambient temperatures with a 0%, 2%, and 4% lime addition. It was discovered that the use of lime with BOF steel making sludge improved both the filter cake moisture and the filtration time. For instance, when comparing the filtration times of tests 1, 2, and 3, the filtration time decreased from 18 minutes with no lime addition, to 16 minutes with a 2% lime addition, and 8 minutes with a 4% lime addition.

Figure 2:
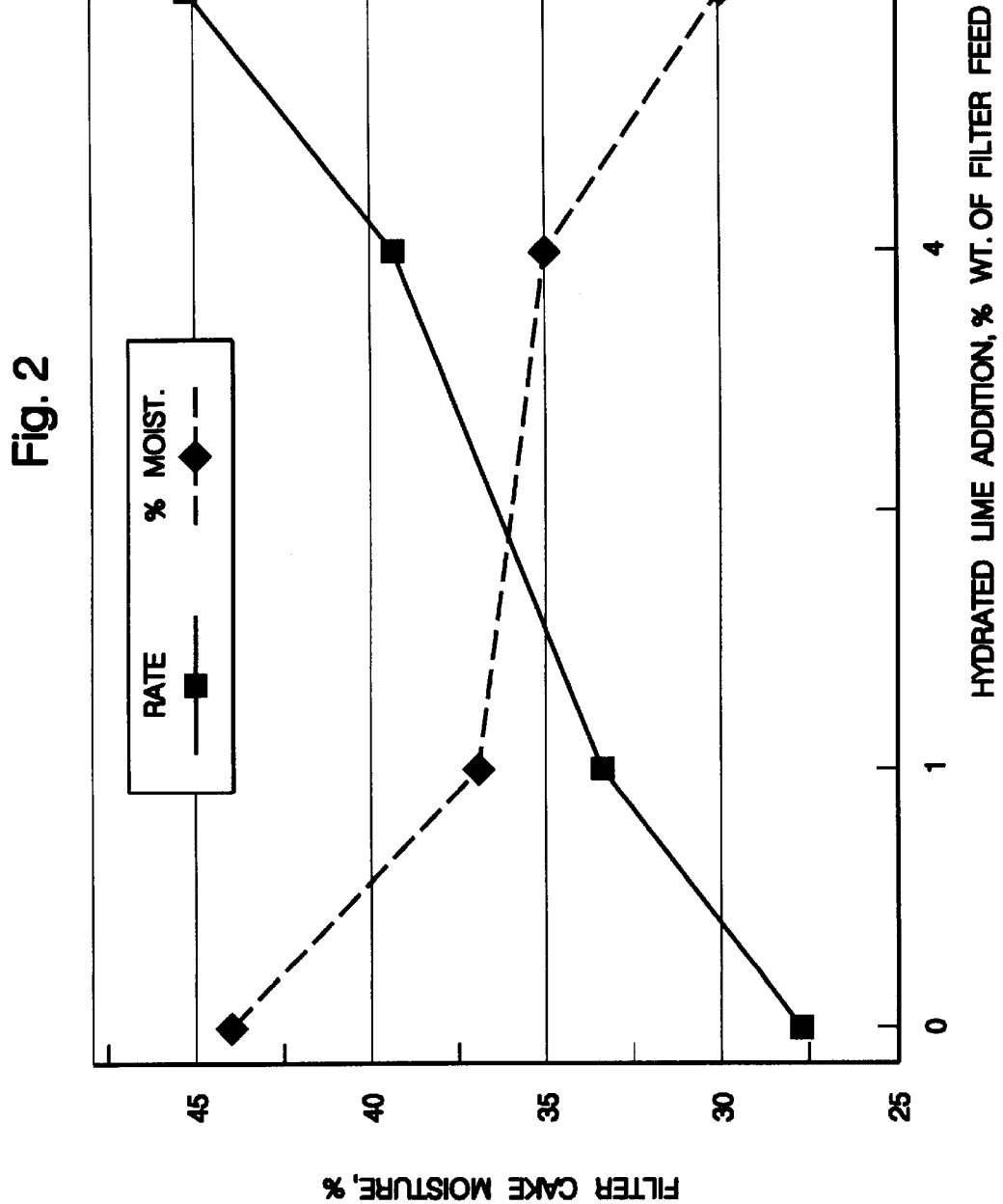
FIG. 2 is a graph of filter cake moisture and filtration rate versus hydrated lime addition for a thickened wastewater slurry.

With reference now to FIG. 2, a graph is illustrated representing the increase in filtration rate as the lime addition is increased, as well as, the reduction in filter cake moisture as the lime is increased for a thickened wastewater slurry. The slurry contains extremely fine particles and a low solids concentration. Thus, the addition of lime acts to flocculate the fine particles to improve the filtration rate while decreasing filter cake moisture. However, the filtration rate levels off at a 5% lime addition. Thus, an addition of lime over 5% is relatively ineffective and not recommended.

While the lime is effective for increasing the filtration rate, it has the added benefit of solidifying the waste. The filter cake 24 hardens from the formation of a calcium carbonate bond between the slurry particles, thus exhibiting properties of a semi-concrete material. After one to two days of aging or curing, the filter cake 24 does not exhibit thixotropic properties. Instead, it becomes friable or easily crumbled. Thus, the filter cake 24 produced is not too wet that it plugs up holes in the landfill and not too dry that fugitive dust is a problem. The filter cake 24 is extremely handleable and suitable at this point for landfill disposal or for recycling, which will be described in more detail below.

Alternatively, the filter cake may contain a significant amount of iron oxides, which can be re-used in iron and steel making operations. For instance, the solid filter cake may be used as recycled feed for a BOF or sintering plant. The presence of lime in the recycled filter cake has the added benefit of acting as a flux. Lime alone is typically used as flux in a BOF. The addition of lime not only has the benefit of increasing the filtration rate, it also eliminates the necessity of adding supplemental lime to a BOF. Thus, the addition of lime is both simple and beneficial for re-use in later steel plant operations, as described above.

The present invention describes a method for increasing the filtration rate of nonhazardous iron and steel making wastes. The lime addition should be carefully controlled depending on the constituents of the wastewater stream. Because, there are numerous facilities in a steel plant, different constituents are contained in the resulting wastewater streams. Thus, the amount of lime needed for treatment of these streams may vary. Should too little lime be added, the material will remain thixotropic and not be able to pass the paint filter test utilized by the EPA. Should too much lime be added, then costs will be excessive. Thus, the lime addition is carefully controlled to produce a suitable filter cake, while significantly increasing the filtration rate.

While this invention has been described as having a preferred design, it is understood that it is capable of further modifications, uses, and/or adaptations of the inventions and including such departures from the present disclosure as come within known or customary practice in the art to which the invention pertains, as may be applied to the central features herein before set forth, and fall within the scope of the invention and the limits of the appended claims.

I claim:

1. A method for increasing the filtration rate of iron and steel making wastes, comprising the steps of:
   a) providing a nonhazardous steel plant wastewater stream;
   b) concentrating solids in the wastewater stream;
   c) adding no more than about 5% by weight of lime to the concentrated wastewater stream;
   d) dewatering the concentrated wastewater stream; and
   e) creating a friable filter cake by allowing the solids to harden.

2. The method of claim 1, further including the step of:
   a) allowing the solids to harden for at least one day.

3. The method of claim 1, further including the step of:
   a) providing a nonhazardous oily mill slurry as the wastewater stream; and
   b) adding about 1% by weight of lime to the concentrated wastewater stream.

4. The method of claim 1, further including the step of:
   a) providing a nonhazardous basic oxygen furnace slurry as the wastewater stream; and
   b) adding no more than 4% by weight of lime to the concentrated wastewater stream.

5. The method of claim 1, further including the step of:
   a) maintaining the wastewater stream at ambient temperatures.

6. The method of claim 1, wherein:
   a) said step of dewatering the concentrated wastewater stream is accomplished by a filter press.

7. The method of claim 6, wherein:
   a) said filter press is a plate and frame filter press.

8. The method of claim 1, wherein:
   a) said lime added is hydrated lime.

9. The method of claim 1, wherein:
   a) said lime added is burnt lime which is hydrated.

* * * * *